United States Patent
Sugama et al.

(10) Patent No.: US 8,976,183 B2
(45) Date of Patent: Mar. 10, 2015

(54) METHOD AND SYSTEM FOR APPROXIMATING CURVE, AND GRAPHIC DISPLAY CONTROL METHOD AND APPARATUS

(75) Inventors: Yasushi Sugama, Kawasaki (JP); Zhiming Tan, Shanghia (CN); Xianghui Bai, Shanghai (CN)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 12/766,531

(22) Filed: Apr. 23, 2010

(65) Prior Publication Data

US 2010/0295858 A1    Nov. 25, 2010

(30) Foreign Application Priority Data

May 25, 2009 (CN) .......................... 2009 1 0142113

(51) Int. Cl.
*G06T 1/20* (2006.01)
*G06T 11/20* (2006.01)

(52) U.S. Cl.
CPC .................................. *G06T 11/203* (2013.01)
USPC ....................................................... 345/442

(58) Field of Classification Search
None
See application file for complete search history.

(56) References Cited

U.S. PATENT DOCUMENTS

| | | | |
|---|---|---|---|
| 5,367,617 A * | 11/1994 | Goossen et al. | 345/442 |
| 5,408,598 A | 4/1995 | Pryor, Jr. | |
| 5,422,990 A * | 6/1995 | Siverbrook et al. | 345/442 |
| 5,581,679 A * | 12/1996 | Takahashi et al. | 345/442 |
| 6,069,554 A | 5/2000 | Hoel | |
| 2001/0046327 A1 * | 11/2001 | Osher et al. | 382/243 |
| 2010/0289802 A1 * | 11/2010 | Falchetto | 345/442 |

FOREIGN PATENT DOCUMENTS

| | | |
|---|---|---|
| EP | 0 577 131 A2 | 1/1994 |
| JP | 2-126376 A | 5/1990 |
| JP | 02-126376 A | 5/1990 |
| JP | 2006-338541 A | 12/2006 |
| JP | 2010-113624 A | 5/2010 |

OTHER PUBLICATIONS

Office Action dated Jun. 4, 2012 of Chinese Application No. 200910142113.4.

(Continued)

*Primary Examiner* — Xiao M. Wu
*Assistant Examiner* — Yingchun He
(74) *Attorney, Agent, or Firm* — Arent Fox LLP (57) ABSTRACT

A method and system for approximating a curve, and a graphic display control method and apparatus are disclosed. The method for approximating a curve comprises the steps of acquiring number information of subdividing points for subdividing a curve needed to be approximated based on coordinate information of control points of the curve, acquiring coordinate information of the subdividing points based on the number information of the subdividing points and the coordinate information of the control points, and connecting the subdividing points with straight lines based on the coordinate information of the subdividing points. The invention could achieve efficient curve approximation and in turn achieve efficient graphic-display control.

11 Claims, 4 Drawing Sheets

(56) References Cited

OTHER PUBLICATIONS

D. MacVicar, et al.: "Bezier Curve Rendering on Virtex <TM>", Field-Programmable Custom Computing Machines, 1999. FCCM '99. Proceedings. Seventh Annual IEEE Symposium on Napa Valley, CA, USA, Apr. 21-23, 1999, Los Alamitos, CA, USA, IEEE Comput. Soc, US, Apr. 21, 1999, pp. 314-315.

A. Rappoport: "Rendering Curves and Surfaces With Hybrid Subdivision and Forward Differencing", ACM Transactions on Graphics, ACM, US, vol. 10, No. 4, Oct. 1, 1991, pp. 323-341.

Third office action issued Jan. 5, 2013, in counterpart Chinese Patent Application No. 200910142113.4 (8 pages including English translation).

Fourth Chinese Office Action dated Sep. 29, 2013 from Chinese Application No. 200910142113.4, 8 pages.

Chinese Office Action dated Apr. 17, 2014; Chinese Application No. 200910142113.4.

Japanese Office Action with English translation dated Feb. 12, 2014.

Japanese Office Action, Japanese Patent Application No. 2010-119386 mailed Feb. 12, 2014.

* cited by examiner

METHOD AND SYSTEM FOR APPROXIMATING CURVE, AND GRAPHIC DISPLAY CONTROL METHOD AND APPARATUS

TECHNICAL FIELD

The invention relates to graphic processing, and particularly relates to a method and apparatus for approximating a curve and a graphic display control method and apparatus.

BACKGROUND

In computer graphics applications, rendering characters is an important branch. Two-dimensional characters are generally formed by quadratic Bezier curves, cubic Bezier curves, and elliptical curves etc., in a two-dimensional plane.

It is inefficient, for a Graphics Display Controller (GDC) chip, to render curves pixel by pixel by tracking along the curves. With appropriate precision, it is reasonable to approximate a curve with straight lines. It is a tradeoff between precision and speed. For many applications of GDC chips, speed overwhelms precision, such as car navigation, mobile phone, and amusement displayer.

Approximating a curve with straight lines needs to firstly subdivide the curve with subdividing points, then calculate coordinates of the subdividing points, and finally connect adjacent subdividing points via straight lines. It is a long existing problem to approximate a curve. There exist many solutions to approximate Bezier curves, such as direct method, recursive subdivision, forward differencing, and hybrid method. However, these methods are not fast enough.

As Bezier curves are commonly represented by polynomials of parameter t (for example, $x(t)=a \cdot t^2+b \cdot t+c$, $y(t)=d \cdot t^2+e \cdot t+f$ for quadratic Bezier curve, where the coefficients a, b, c, d, e, and f can be calculated by control points of the quadratic Bezier curve), the coordinate values of each subdividing point can be calculated directly, given the parameter t at each subdividing point. Although this method is simple and direct, it needs too many multiplications for each subdividing point.

Recursive subdivision is a recursive procedure, to find step by step subdividing points by calculating the middle points on each edge of a control polygon. Connecting adjacent subdividing points will form straight lines. Setting an appropriate threshold of flatness, the straight lines will approximate a curve with reasonable precision. However, the recursive procedure and calculating flatness will take a large amount of time.

Forward differencing is suitable for Bezier curves. The coordinate values of a next subdividing point can be got by adding the coordinate values of a previous subdividing point with difference values. With a fixed step, the coordinate values of each subdividing point can be calculated by just several addition operations. Therefore, the speed is very high. However, the number of the subdividing points (i.e. the step) needs to be determined before calculating the coordinates.

The hybrid method combines recursive subdivision and forward differencing together. It first uses recursive subdivision and flatness to obtains the parameter of each subdividing point, and then uses forward differencing to calculate the coordinate values of each subdividing point. This method is complex for implementation.

Therefore, a method and/or apparatus for approximating a curve, used in curve rendering and more efficient than the abovementioned methods, are needed.

SUMMARY OF THE INVENTION

In view of one or more of the above problems, this invention proposes a method and apparatus for approximating a curve and a graphic-display control method and apparatus.

The method for approximating a curve according to an aspect of the invention, comprising the steps of: acquiring number information of subdividing points for subdividing a curve needed to be approximated based on coordinate information of control points of the curve; acquiring coordinate information of the subdividing points based on the number information of the subdividing points and the coordinate information of the control points; and connecting the subdividing points with straight lines based on the coordinate information of the subdividing points.

The apparatus for approximating a curve according to another aspect of the invention, comprising: a number acquiring unit configured to acquire number information of subdividing points for subdividing a curve needed to be approximated based on coordinate information of control points of the curve; a coordinate acquiring unit configured to acquire coordinate information of the subdividing points based on the number information of the subdividing points and the coordinate information of the control points; and a curve approximating unit configured to connect the subdividing points with straight lines based on the coordinate information of the subdividing points.

The graphic-display control method according to still another aspect of the invention, comprising the steps of: acquiring number information of subdividing points for subdividing a curve needed to be approximated based on coordinate information of control points of the curve; acquiring coordinate information of the subdividing points based on the number information of the subdividing points and the coordinate information of the control points; and connecting the subdividing points with straight lines based on the coordinate information of the subdividing points and drawing the straight lines connecting the subdividing points according to rendering parameters.

The graphic-display control apparatus according to still another aspect of the invention, comprising: a number acquiring unit configured to acquire number information of subdividing points for subdividing a curve needed to be approximated based on coordinate information of control points of the curve; a coordinate acquiring unit configured to acquire coordinate information of the subdividing points based on the number information of the subdividing points and the coordinate information of the control points; and a curve rendering unit configured to connect the subdividing points with straight lines based on the coordinate information of the subdividing points and draw the straight lines connecting the subdividing points according to rendering parameters.

To sum up, the invention achieves efficient curve approximation and efficient graphic-display control by acquiring the number information of the subdividing points for subdividing a curve by means of using the coordinate information of the control points of the curve, acquiring the coordinate information of the subdividing points according to the number information of the subdividing points and the coordinate information of the control points.

BRIEF DESCRIPTION OF THE DRAWINGS

The invention can be easily understood from the following description of the preferred embodiments of this invention in conjunction with the drawings, in which.

DESCRIPTIONS OF THE PREFERRED EMBODIMENTS

Features in respective aspects and exemplary embodiments of the invention will be described in detail below. In the following detailed description, a number of specific details are proposed to provide thorough understanding of the invention. However, it is obvious to those skilled in the art that the invention can be implemented without some of the specific details. The following descriptions of the embodiments are merely to provide better understanding of the invention by illustrating examples of the invention. The invention is not limited to any specific configuration and algorithm mentioned below, and covers any modification, substitution and improvement of the elements, components and algorithms without departing from the spirit of the invention. In the figures and the following description, well-known structures and techniques are not disclosed to avoid unnecessarily obscuring the invention.

Figure 1:
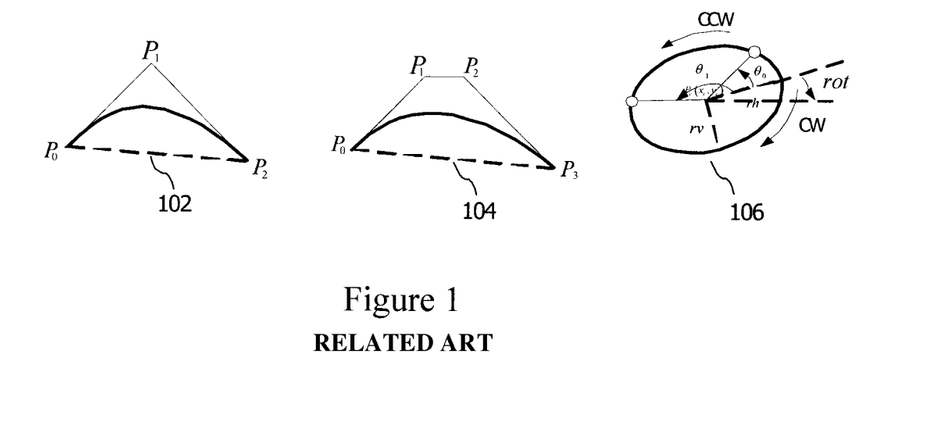
FIG. 1 illustrates schematic diagrams of a quadratic Bezier curve, a cubic Bezier curve and an elliptical curve.

FIG. 1 illustrates diagrams of a quadratic Bezier curve, a cubic Bezier curve and an elliptical curve. As shown in FIG. 1, the quadratic Bezier curve 102 has three control points: $P_0(x_0, y_0)$, $P_1(x_1, y_1)$ and $P_2(x_2, y_2)$; the cubic Bezier curve 104 has four control points: $P_0(x_0, y_0)$, $P_1(x_1, y_1)$, $P_2(x_2, y_2)$ and $P_3(x_3, y_3)$. These control points constitute a control polygon for each curve respectively. The elliptical curve 106 has a horizontal radius rh, a vertical radius rv, a starting angle $\theta_0$, a terminating angle $\theta_1$, a center point $P_c(x_c, y_c)$, a rotation angle rot and a symbol indicating whether the elliptical curve rotates counterclockwise (CCW) or clockwise (CW).

The parametrical equation of the quadratic Bezier curve is $$x(t)=(1-t)^2 x_0+2t(1-t)x_1+t^2 x_2$$

$$y(t)=(1-t)^2 y_0+2t(1-t)y_1+t^2 y_2 \quad (1)$$

where $0 \leq t \leq 1$. The parametrical equation of the quadratic Bezier curve can be set as another form:

$$x(t)=a_{qx}t^2+b_{qx}t+c_{qx}$$

$$y(t)=a_{qy}t^2+b_{qy}t+c_{qy} \quad (2)$$

where $a_{qx}=x_2-2x_1+x_0$, $b_{qx}=2(x_1-x_0)$, $c_{qx}=x_0$, $a_{qy}=y_2-2y_1+y_0$, $b_{qy}=2(y_1-y_0)$, and $c_{qy}=y_0$.

The parametrical equation of the cubic Bezier curve is $$x(t)=(1-t)^3 x_0+3t(1-t)^2 x_1+3t^2(1-t)x_2+t^3 x_3$$

$$y(t)=(1-t)^3 y_0+3t(1-t)^2 y_1+3t^2(1-t)y_2+t^3 y_3 \quad (3)$$

where $0 \leq t \leq 1$. The parametrical equations of the cubic Bezier curve can also be set as another form:

$$x(t)=a_{cx}t^3+b_{cx}t^2+c_{cx}t+d_{cx}$$

$$y(t)=a_{cy}t^3+b_{cy}t^2+c_{cy}t+d_{cy} \quad (4)$$

wherein $a_{cx}=x_3-3x_2+3x_1-x_0$, $b_{cx}=3x_2-6x_1+3x_0$, $c_{cx}=3x_1-3x_0$, $d_{cx}=x_0$, $a_{cy}=y_3-3y_2+3y_1-y_0$, $b_{cy}=3y_2-6y_1+3y_0$, $c_{cy}=3y_1-3y_0$ and $d_{cy}=y_0$.

The parametrical equation of the elliptical curve is $$\begin{bmatrix} x \\ y \\ 1 \end{bmatrix} = \begin{bmatrix} rh \cdot \cos(rot) & -rv \cdot \sin(rot) & x_c \\ rh \cdot \sin(rot) & rv \cdot \cos(rot) & y_c \\ 0 & 0 & 1 \end{bmatrix} \begin{bmatrix} \cos\theta \\ \sin\theta \\ 1 \end{bmatrix}, \quad (5)$$

where $\theta$ is the parameter of any point on the elliptical curve, and rot is the rotation angle of the elliptical curve relative to the coordinate system. The elliptical curve can be regarded as a result of affine transforming a unit circle ($\cos\theta$, $\sin\theta$).

Figure 2:
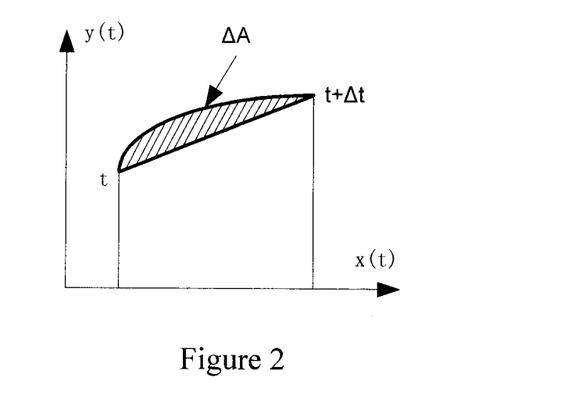
FIG. 2 illustrates schematic diagram of a relationship between an area difference and a subdividing step, wherein the area difference is the difference between the area of a curve segment corresponding to the subdividing step with respect to X coordinate axis and the area of a line segment of two points corresponding to the subdividing step on the curve with respect to X coordinate axis.

FIG. 2 illustrates a schematic diagram of a relationship between an area difference and a subdividing step, wherein the area difference is the difference between the area of a curve segment corresponding to the subdividing step with respect to X coordinate axis and the area of a line segment of two points corresponding to the subdividing step on the curve with respect to X coordinate axis.

The area difference $\Delta A$ between the area of a curve segment corresponding to a subdividing step $\Delta t$ with respect to X coordinate axis and the area of a line segment between two points corresponding to the subdividing step on the curve with respect to X coordinate axis can be obtained by the following expression:

$$\Delta A = A - A_a, \quad (6)$$

where A is the area of the curve segment corresponding to $\Delta t$ with respect to X coordinate axis, and $A_a$ is the area of the line segment between two end points on the curve segment with respect to X coordinate axis.

If the curve segment is part of the quadratic Bezier curve, then there exist the following equations $$\begin{aligned} A &= \int_{t}^{t+\Delta t} y(t) \, dx(t) \\ &= \int_{t}^{t+\Delta t} (a_{qy}t^2 + b_{qy}t + c_{qy})(2a_{qx}t + b_{qx}) \, dt \\ &= \frac{a_{qx}a_{qy}}{2}\Delta t^4 + \left(2a_{qx}a_{qy}t + \frac{a_{qy}b_{qx} + 2a_{qx}b_{qy}}{3}\right)\Delta t^3 + \\ &\quad \left(\begin{array}{c} 3a_{qx}a_{qy}t^2 + \\ (a_{qy}b_{qx} + 2a_{qx}b_{qy})t + \\ \frac{b_{qx}b_{qy} + 2a_{qx}c_{qy}}{2} \end{array}\right)\Delta t^2 + \left(\begin{array}{c} 2a_{qx}a_{qy}t^3 + \\ (a_{qy}b_{qx} + 2a_{qx}b_{qy})t^2 + \\ (b_{qx}b_{qy} + 2a_{qx}c_{qy})t + \\ b_{qx}c_{qy} \end{array}\right)\Delta t \end{aligned} \quad (7)$$

and

-continued $$A_a = \frac{(y(t) + y(t+\Delta t)) \cdot (x(t+\Delta t) - x(t))}{2} \quad (8)$$

$$= \frac{1}{2}\begin{pmatrix} a_{qy}t^2 + b_{qy}t + c_{qy} + a_{qy}(t+\Delta t)^2 + \\ b_{qy}(t+\Delta t) + c_{qy} \end{pmatrix} \cdot$$

$$(a_{qx}(\Delta t^2 + 2t \cdot \Delta t) + b_{qx}\Delta t)$$

$$= \frac{a_{qx}a_{qy}}{2}\Delta t^4 + \left(2a_{qx}a_{qy}t + \frac{a_{qy}b_{qx} + a_{qx}b_{qy}}{2}\right)\Delta t^3 +$$

$$\begin{pmatrix} 3a_{qx}a_{qy}t^2 + \\ (a_{qy}b_{qx} + 2a_{qx}b_{qy})t + \\ \frac{b_{qx}b_{qy} + 2a_{qx}c_{qy}}{2} \end{pmatrix}\Delta t^2 + \begin{pmatrix} 2a_{qx}a_{qy}t^3 + \\ (a_{qy}b_{qx} + 2a_{qx}b_{qy})t^2 + \\ (b_{qx}b_{qy} + 2a_{qx}c_{qy})t + \\ b_{qx}c_{qy} \end{pmatrix}\Delta t$$

Therefore, the area difference between the area of the curve segment corresponding to $\Delta t$ with respect to X coordinate axis and the area of the line segment between the two points on the curve segment corresponding to the subdividing step with respect to X coordinate axis is $$\Delta A = A - A_a \quad (9)$$

$$= \left(\frac{a_{qy}b_{qx} + 2a_{qx}b_{qy}}{3} - \frac{a_{qy}b_{qx} + a_{qx}b_{qy}}{2}\right)\Delta t^3$$

$$= \frac{a_{qx}b_{qy} - a_{qy}b_{qx}}{6}\Delta t^3$$

$$= Q \cdot \Delta t^3$$

As can be seen from the above expression, the area difference has no relationship with the parameter t, but with $\Delta t$. If $\Delta A$ is set to a threshold T, (5 pixels, for example), $\Delta t$ can be obtained by the following expression:

$$\Delta t = \sqrt[3]{\frac{T}{Q}} \cdot \quad (10)$$

If the curve segment is part of the cubic Bezier curve, then there exist the following equations:

$$A = \int_t^{t+\Delta t} y(t)\,dx(t) \quad (11)$$

$$= \int_t^{t+\Delta t} (a_{cy}t^3 + b_{cy}t^2 + c_{cy}t + d_{cy})(3a_{cx}t^2 + 2b_{cx}t + c_{cx})dt$$

$$= \frac{a_{cx}a_{cy}}{2}\Delta t^6 + \left(3a_{cx}a_{cy}t + \frac{3a_{cx}b_{cy} + 2a_{cy}b_{cx}}{5}\right)\Delta t^5 +$$

$$\begin{pmatrix} \frac{15a_{cx}a_{cy}}{2}t^2 + (2a_{cy}b_{cx} + 3a_{cx}b_{cy})t + \begin{pmatrix} a_{cy}c_{cx} + \\ 2b_{cx}b_{cy} + \\ \frac{3a_{cx}c_{cy}}{4} \end{pmatrix} \end{pmatrix}\Delta t^4 +$$

$$\begin{pmatrix} 10a_{cx}a_{cy}t^3 + (4a_{cy}b_{cx} + 6a_{cx}b_{cy})t^2 + \begin{pmatrix} a_{cy}c_{cx} + \\ 2b_{cx}b_{cy} + \\ 3a_{cx}c_{cy} \end{pmatrix}t + \\ \frac{b_{cy}c_{cx} + 2b_{cx}c_{cy} + 3a_{cx}d_{cy}}{3} \end{pmatrix}\Delta t^3 +$$

$$\begin{pmatrix} \frac{15a_{cx}a_{cy}}{2}t^4 + (4a_{cy}b_{cx} + 6a_{cx}b_{cy})t^3 + \frac{\begin{pmatrix}3a_{cy}c_{cx}+\\6b_{cx}b_{cy}+\\9a_{cx}c_{cy}\end{pmatrix}}{2}t^2 + \\ \begin{pmatrix} b_{cy}c_{cx} + \\ 2b_{cx}c_{cy} + \\ 3a_{cx}d_{cy} \end{pmatrix}t + \frac{c_{cx}c_{cy} + 2b_{cx}d_{cy}}{2} \end{pmatrix}\Delta t^2 +$$

$$\begin{pmatrix} 3a_{cx}a_{cy}t^5 + \begin{pmatrix}2a_{cy}b_{cx}+\\3a_{cx}b_{cy}\end{pmatrix}t^4 + \begin{pmatrix}a_{cy}c_{cx}+\\2b_{cx}b_{cy}+3a_{cx}c_{cy}\end{pmatrix}t^3 + \\ \begin{pmatrix}b_{cy}c_{cx}+\\2b_{cx}c_{cy}+3a_{cx}d_{cy}\end{pmatrix}t^2 + (c_{cx}c_{cy}+2b_{cx}d_{cy})t + c_{cx}d_{cy} \end{pmatrix}\Delta t$$

and $$A_a = \frac{(y(t) + y(t+\Delta t)) \cdot (x(t+\Delta t) - x(t))}{2} \quad (12)$$

$$= \frac{1}{2}\begin{pmatrix} a_{cy}t^3 + b_{cy}t^2 + c_{cy}t + d_{cy} + a_{cy}(t+\Delta t)^3 + \\ b_{cy}(t+\Delta t)^2 + c_{cy}(t+\Delta t) + d_{cy} \end{pmatrix} \cdot$$

$$(a_{cx}(\Delta t^3 + 3t \cdot \Delta t^2 + 3t^2 \cdot \Delta t) + b_{cx}(\Delta t^2 + 2t \cdot \Delta t) + c_{cx}\Delta t)$$

$$= \frac{a_{cx}a_{cy}}{2}\Delta t^6 + \left(3a_{cx}a_{cy}t + \frac{a_{cx}b_{cy} + a_{cy}b_{cx}}{2}\right)\Delta t^5 +$$

$$\begin{pmatrix} \frac{15a_{cx}a_{cy}}{2}t^2 + \\ \frac{5a_{cy}b_{cx} + 5a_{cx}b_{cy}}{2}t + \\ \frac{a_{cy}c_{cx} + b_{cx}b_{cy} + a_{cx}c_{cy}}{2} \end{pmatrix}\Delta t^4 +$$

$$\begin{pmatrix} 10a_{cx}a_{cy}t^3 + \frac{9a_{cy}b_{cx} + 11a_{cx}b_{cy}}{2}t^2 + \\ \frac{5a_{cx}c_{cy} + 4b_{cx}b_{cy} + 3a_{cy}c_{cx}}{2}t + \\ \frac{b_{cy}c_{cx} + b_{cx}c_{cy} + 2a_{cx}d_{cy}}{2} \end{pmatrix}\Delta t^3 +$$

$$\begin{pmatrix} \frac{15a_{cx}a_{cy}}{2}t^4 + (4a_{cy}b_{cx} + 6a_{cx}b_{cy})t^3 + \frac{9a_{cx}c_{cy}}{2}t^2 + \end{pmatrix}\Delta t^2 +$$

$$\begin{pmatrix} 3a_{cx}a_{cy}t^5 + \begin{pmatrix}2a_{cy}b_{cx}+\\3a_{cx}b_{cy}\end{pmatrix}t^4 + \begin{pmatrix}a_{cy}c_{cx}+\\2b_{cx}b_{cy}+3a_{cx}c_{cy}\end{pmatrix}t^3 + \\ \frac{b_{cy}c_{cx}+}{2b_{cx}c_{cy} + 3a_{cx}d_{cy}}t^2 + (c_{cx}c_{cy}+2b_{cx}d_{cy})t + c_{cx}d_{cy} \end{pmatrix}\Delta t$$

Then, $$\Delta A = A - A_a \quad (13)$$

$$= \left(\frac{a_{cx}b_{cy} - a_{cy}b_{cx}}{10}\right)\Delta t^5 + \left(\frac{\frac{a_{cx}b_{cy} - a_{cy}b_{cx}}{2}t + \frac{a_{cx}c_{cy} - a_{cy}c_{cx}}{4}}{}\right)\Delta t^4 +$$

$$\begin{pmatrix} \frac{a_{cx}b_{cy} - a_{cy}b_{cx}}{2}t^2 + \\ \frac{a_{cx}c_{cy} - a_{cy}c_{cx}}{2}t + \\ \frac{b_{cx}c_{cy} - b_{cy}c_{cx}}{6} \end{pmatrix}\Delta t^3$$

As $\Delta t$ is between $(0,1]$ under general conditions, two items $\Delta t^5$ 和 $\Delta t^4$ can be omitted, then the above mentioned equation (13) becomes $$\Delta A \approx \begin{pmatrix} \frac{a_{cx}b_{cy}-a_{cy}b_{cx}}{2}t^2 + \\ \frac{a_{cx}c_{cy}-a_{cy}c_{cx}}{2}t + \frac{b_{cx}c_{cy}-b_{cy}c_{cx}}{6} \end{pmatrix} \Delta t^3 \quad (14)$$
$$= C(t) \cdot \Delta t^3.$$

If the maximum value of $$C(t) = \frac{a_{cx}b_{cy}-a_{cy}b_{cx}}{2}t^2 + \frac{a_{cx}c_{cy}-a_{cy}c_{cx}}{2}t + \frac{b_{cx}c_{cy}-b_{cy}c_{cx}}{6}$$
$$= L \cdot t^2 + M \cdot t + N$$

can be obtained, then the abovementioned equation (14) will be $$\Delta A \approx C_{max} \cdot \Delta t^3 \quad (15)$$

As in general cases, the scope of t is [0.0,1.0], to find the maximum value of $C(t)$ is to find the maximum value of among $t=0.0$, $t=1.0$ and $$t = -\frac{M}{2L}.$$

These three values are $$val_{t=0} = \frac{b_x c_y - b_y c_x}{6} \quad (16)$$
$$val_{t=1} = \frac{a_x b_y - a_y b_x}{2} + \frac{a_x c_y - a_y c_x}{2} + \frac{b_x c_y - b_y c_x}{6}$$
$$val_{t=-M/(2L)} = -\frac{M^2}{4L} + N$$

Therefore, $$C_{max} = \max(val_{t=0}, val_{t=1}, val_{t=-M/(2L)}) \quad (17)$$

Finally, if $\Delta A$ is set to a threshold T (5 pixels, for example), then the following expression will be gotten:

$$\Delta t = \sqrt[3]{\frac{T}{C_{max}}} \quad (18)$$

If the curve segment is part of the elliptical curve, which is centered at the original point of the coordinate system, and has no rotation relative to X coordinate axis, then there exist the following equations:

$$A = \int_t^{t+\Delta t} y(t)dx(t) \quad (19)$$
$$= \int_t^{t+\Delta t} (rv\sin t)(-rh\sin t)dt$$
$$= \frac{rh \cdot rv}{2} \begin{pmatrix} \sin(t+\Delta t)\cos(t+\Delta t) - \\ \sin t \cos t - \Delta t \end{pmatrix}$$

and $$A_a = \frac{(y(t)+y(t+\Delta t))\cdot(x(t+\Delta t)-x(t))}{2} \quad (20)$$
$$= \frac{(rv\sin t + rv\sin(t+\Delta t))\cdot(rh\cos(t+\Delta t)-rh\cos t)}{2}$$
$$= \frac{rh \cdot rv}{2}\begin{pmatrix} \sin t \cos(t+\Delta t) - \sin t \cos t + \\ \sin(t+\Delta t)\cos(t+\Delta t) - \sin(t+\Delta t)\cos t \end{pmatrix}$$

Then $$\Delta A = A - A_a \quad (21)$$
$$= \frac{rh \cdot rv}{2}(\sin \Delta t - \Delta t)$$

The absolute value of $\Delta A$ is $$|\Delta A| = \frac{rh \cdot rv}{2}(\Delta t - \sin \Delta t) \quad (22)$$
$$= \frac{rh \cdot rv}{2}\left(\Delta t - \left(\Delta t - \frac{\Delta t^3}{3!} + \frac{\Delta t^5}{5!} + \ldots\right)\right)$$
$$\approx \frac{rh \cdot rv}{2} \frac{\Delta t^3}{3!}$$
$$= \frac{rh \cdot rv}{12}\Delta t^3$$
$$= E \cdot \Delta t^3$$

Finally, if $\Delta A$ is set to a threshold T, (5 pixels, for example), then $$\Delta t = \sqrt[3]{\frac{T}{E}} \quad (23)$$

After the subdividing step $\Delta t$ is obtained, the number of the subdividing points can be obtained by the following expression:

$$n = \text{int}(1/\Delta t) + 1 \quad (24)$$

As the elliptical curve can be obtained by affine transforming a unit circle curve, coordinate information of the subdividing points can be calculated on the unit circle curve. As the number n of the subdividing points has already been obtained and the angle of the circular arc on the unit circle curve corresponding to the elliptical curve is $\theta_1 - \theta_0$ all, the angle difference between two adjacent subdividing points on the circular arc of the unit circle is $(\theta_1-\theta_0)/n$. From $\theta_0$ to $\theta_1$, the coordinates of each subdividing point on the circular arc are calculated according to $x = \cos \theta$ and $y = \sin \theta$. Herein, the number of subdividing points on the circular arc of the unit circle is the same as that of the elliptical curve.

Figure 3:
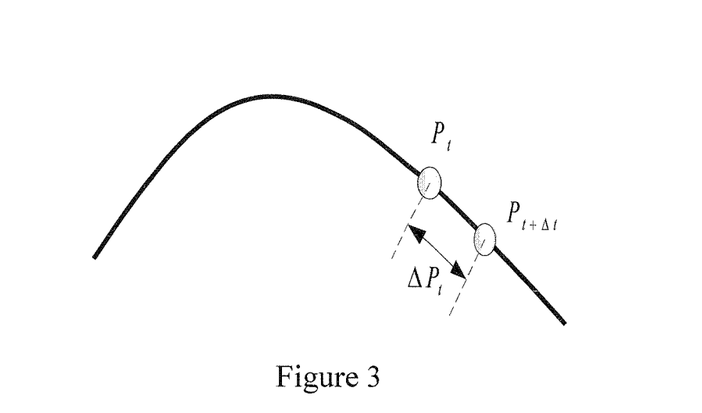
FIG. 3 illustrates a conceptual schematic diagram of forward differencing for approximating a Bezier curve.

FIG. 3 illustrates a conceptual schematic diagram of forward differencing for approximating a Bezier curve. For any point $P_{t+\Delta t}$ on the curve, the coordinate values can be calculated from the coordinate values of the previous point $P_t$, given the curve length difference $\Delta P_t$, as follows:

$$P_{t+\Delta t} = P_t + \Delta P_t \quad (25)$$

If $P_{t+\Delta t}$ is treated as parameter equations, then $$x(t+\Delta t) = x(t) + \Delta x(t)$$
$$y(t+\Delta t) = y(t) + \Delta y(t) \quad (26)$$

If the curve is a quadratic Bezier curve, then $$\Delta x(t) = 2(X_1-X_0)\Delta t \cdot t + (X_1-X_0)\Delta^2 t + 2X_0 \Delta t$$
$$\Delta y(t) = 2(Y_1-Y_0)\Delta t \cdot t + (Y_1-Y_0)\Delta^2 t + 2Y_0 \Delta t \quad (27)$$

where $X_0=x_1-x_0$, $Y_0=y_1-y_0$, $X_1=x_2-x_1$, and $Y_1=y_2-y_1$.
Similarly, $$\Delta x(t+\Delta t)=\Delta x(t)+\Delta^2 x(t)$$

$$\Delta y(t+\Delta t)=\Delta y(t)+\Delta^2 y(t) \qquad (28)$$

So, $$\Delta^2 x(t)=\Delta(\Delta x(t))=2(X_1-X_0)\Delta^2 t$$

$$\Delta^2 y(t)=\Delta(\Delta y(t))=2(Y_1-Y_0)\Delta^2 t \qquad (29)$$

If the curve is defined in iterative terms $x_{n+1}=x_n+\Delta x_n$, $\Delta x_n=\Delta x_{n-1}+\Delta^2 x_{n-1}$, and $y_{n+1}=y_n+\Delta y_n$, $y_{n+1}=y_n+\Delta y_n$, then $x_{n+1}$ and $y_{n+1}$ can be obtained in an iterative way.

The coordinate values of the first subdividing point, $\Delta x$ and $\Delta y$ between the second and first subdividing points can be obtained by substituting the value of t on the first subdividing point into the expressions (1) and (27) respectively. Herein, the value of t can be, for example, 0.

If the curve is a cubic Bezier curve, then $$\Delta x(t)=3A_x\Delta t \cdot t^2+3(A_x\Delta^2 t+2B_x\Delta t)t+(A_x\Delta^3 t+3B_x\Delta^2 t+3C_x\Delta t)$$

$$\Delta y(t)=3A_y\Delta t \cdot t^2+3(A_y\Delta^2 t+2B_y\Delta t)t+(A_y\Delta^3 t+3B_y\Delta^2 t+3C_y\Delta t) \qquad (30)$$

where $A_x=(X_2-X_1)-(X_1-X_0)$, $B_x=(X_1-X_0)$, $C_x=X_0$, $X_2=x_3-x_2$, $A_y=(Y_2-Y_1)-(Y_1-Y_0)$, $B_y=(Y_1-Y_0)$, $C_y=Y_0$ and $Y_2=y_3-y_2$.

Likewise, $$\Delta^2 x(t)=\Delta(\Delta x(t))=6A_x\Delta^2 t \cdot t+6A_x\Delta^3 t+6B_x\Delta^2 t$$

$$\Delta^2 y(t)=\Delta(\Delta y(t))=6A_y\Delta^2 t \cdot t+6A_y\Delta^3 t+6B_y\Delta^2 t \qquad (31)$$

and $$\Delta^3 x(t)=\Delta(\Delta^2 x(t))=6A_x\Delta^3 t$$

$$\Delta^3 y(t)=\Delta(\Delta^2 y(t))=6A_y\Delta^3 t \qquad (32)$$

If the curve is defined in iterative terms $x_{n+1}=x_n+\Delta x_n$, $\Delta x_n=\Delta x_{n-1}+\Delta^2 x_{n-1}$, $\Delta^2 x_{n-1}=\Delta^2 x_{n-2}+\Delta^3 x_{n-2}$, and $y_{n+1}=y_n+\Delta y_n$, $y_{n+1}=y_n+\Delta y_n$, $\Delta^2 y_{n-1}=\Delta^2 y_{n-2}+\Delta^3 y_{n-2}$, then $x_{n+1}$ and $y_{n+1}$ can be calculated in an iterative way. Likewise, the coordinate values of the first subdividing point, $\Delta x$ and $\Delta y$ between the second and first subdividing points, and $\Delta^2 x$ and $\Delta^2 y$ between the second and first subdividing points can be obtained by substituting the value of t on the first subdividing point into the expressions (3), (30) and (31) respectively. Herein, the value of t on the first subdividing point can be, for example, 0.

Figure 4:
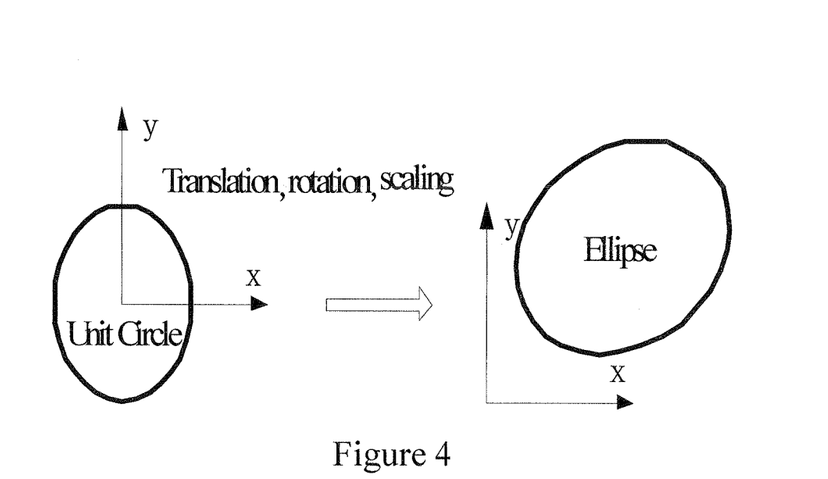
FIG. 4 illustrates a schematic diagram of the procedure for affine transforming a unit circle to acquire an ellipse.

FIG. 4 illustrates a schematic diagram of the procedure for affine transforming a unit circle, with translation, rotation and scaling, to acquire an ellipse. The unit circle curve can be defined as $(x(\theta),y(\theta),1)^T=(\cos\theta,\sin\theta,1)^T$, and the ellipse curve can be obtained by first subdividing the unit circle into points and then affine transforming the subdividing points. According to the coordinates $(\cos\theta,\sin\theta,1)^T$ of the subdividing points on the unit circle arc and the equation (5), the coordinates $(x,y,1)^T$ of an ellipse curve after affine transformation can be obtained through the following specific calculating formulas:

$$x=rh\cdot\cos(rot)\cdot\cos\theta-rv\cdot\sin(rot)\cdot\sin\theta+x_c$$

$$y=rh\cdot\sin(rot)\cdot\cos\theta+rv\cdot\cos(rot)\cdot\sin\theta+x_c \qquad (33)$$

Figure 5:
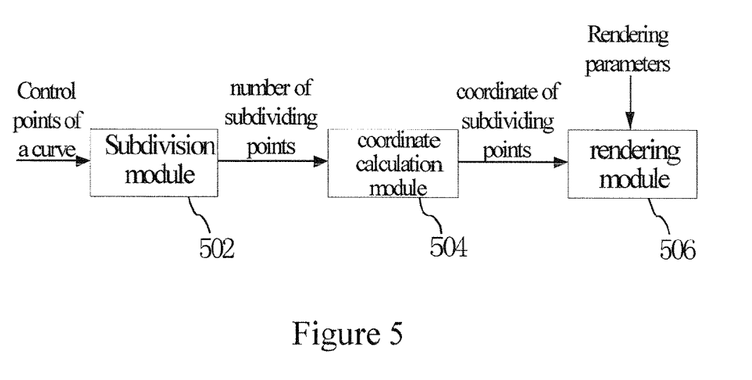
FIG. 5 illustrates a block diagram of a graphic-display control apparatus according to an embodiment of the invention.

FIG. 5 illustrates a block diagram of a graphic-display control apparatus according to an embodiment of the invention. As shown in FIG. 5, the graphic-display control apparatus comprises a subdivision module (corresponding to the number acquiring unit) 502, a coordinate calculation module (corresponding to the coordinate acquiring unit) 504, and a rendering module (corresponding to the curve rendering unit) 506. A curve and rendering parameters are acquired by the graphic-display control apparatus from outside, and the curve is represented by its control points. Firstly, the subdivision module acquires number information of subdividing points for subdividing a curve by using coordinate information of control points of the curve. Secondly, the coordinate calculation module acquires the coordinate information of each subdividing point according to the number information of the subdividing points and the coordinate information of the control points, by using the method of forward difference when the curve is a Bezier curve or the method of affine transformation when the curve is an ellipse curve. Finally the rendering module connects the subdividing points by straight lines according to the coordinate information of each subdividing point and renders the straight lines connecting respective subdividing points by using the rendering parameters.

Figure 6:
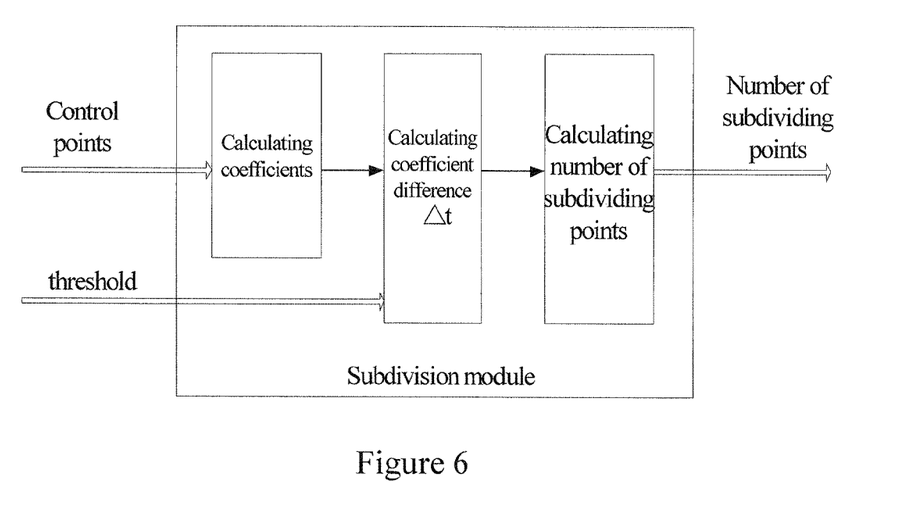
FIG. 6 illustrates a detailed block diagram of a subdivision module shown in FIG. 5.

FIG. 6 illustrates a detailed block diagram of a subdivision module shown in FIG. 5. As shown in FIG. 6, the subdividing module calculates coefficients Q, $C_{max}$ and E in a curve function according to the coordinate information of the control points of the curve input from outside, acquires the relationship between an area difference and a subdividing step based on the curve function, the area difference being the difference between the area of a curve segment corresponding to the subdividing step on the curve with respect to X coordinate axis and the area of a line segment of two points corresponding to the subdividing step on the curve with respect to X coordinate axis, calculates the subdividing step $\Delta t$ according to the acquired relationship and a threshold input from outside, and calculates the number n of the subdividing points by using the subdividing step $\Delta t$.

Figure 7:
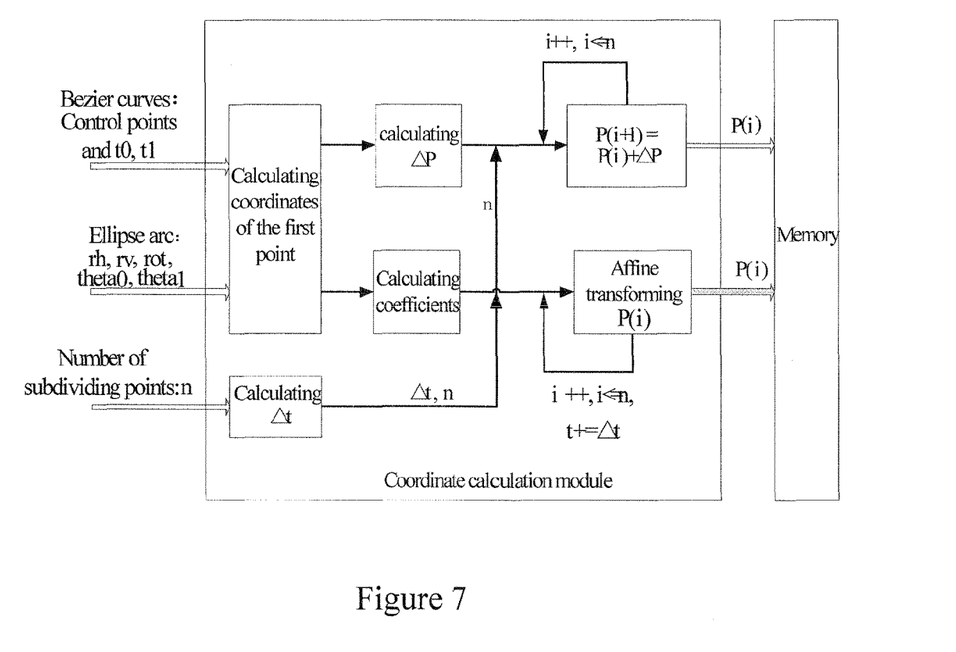
FIG. 7 illustrates a detailed block diagram of a coordinate calculation module shown in FIG. 5.

FIG. 7 illustrates a detailed block diagram of a coordinate calculation module shown in FIG. 5. As shown in FIG. 7, the coordinate calculation module calculates the parameter difference $\Delta t$ according to the number of the subdividing points, and calculates the coordinate information of the first subdividing point according to coordinate information of the control points. Then it calculates a curve difference $\Delta P$ between adjacent subdividing points for the Bezier curve, and calculates affine transformation coefficients for the ellipse curve. By using the difference value $\Delta P$ between adjacent subdividing points, it calculates the coordinate values of the subdividing points of the Bezier curve. By using the affine transformation coefficients, it affine transforms the subdividing points on the unit circle to the subdividing points on the ellipse curve. Finally, the coordinate values of each subdividing point are stored in an external memory for the rendering module.

To sum up, the invention acquires the number information of subdividing points for subdividing a curve by using coordinate information of control points of the curve, and then acquires coordinate information of the subdividing points according to the number information of the subdividing points and the coordinate information of the control points, thereby achieving high efficient curve approximation and further high efficient graphic-display control.

What needs to be noted is that respect modules and/or units shown in FIG. 5 can be implemented by using pre-programmed firmware or hardware component (for example ASIC) or by using data processing devices including EEPROM or other components.

Those skilled in the art will understand that there exist more optional embodiments and modifications for implementing the embodiments of this invention, and the abovementioned embodiments and examples are only descriptions of one or more embodiments. Therefore, the scope of this invention is restricted only by the claims attached.

What is claimed is:

1. A method for approximating a curve implemented on an apparatus comprising a subdivision module and a coordination calculation module, the subdivision module and the coordination calculation module including at least one processor, the method comprising:
acquiring, via a subdivision module, number information of subdividing points for subdividing a curve needed to be approximated based on coordinate information of control points of the curve;
acquiring, via a coordinate calculation module, coordinate information of the subdividing points based on the number information of the subdividing points and the coordinate information of the control points, wherein the subdividing points are points on the curve; and
connecting the subdividing points with straight lines based on the coordinate information of the subdividing points,
wherein acquiring the number information of the subdividing points comprises:
acquiring a curve function of the curve based on the coordinate information of the control points;
acquiring a relationship between an area difference and a subdividing step size based on the curve function, wherein the area difference is the difference between the area of a curve segment corresponding to the subdividing step size on the curve with respect to an X coordinate axis and the area of a line segment of two points corresponding to the subdividing step size on the curve with respect to the X coordinate axis;
calculating a subdividing step size corresponding to a set area difference based on the relationship between the area difference and the subdividing step; and
calculating the number information of the subdividing points using the subdividing step size corresponding to the set area difference,
wherein calculating a subdividing step size corresponding to a set area difference based on the relationship between the area difference and the subdividing step size comprises dividing the set area difference by a coefficient of the relationship between the area difference and the subdividing step.

2. The method for approximating a curve of claim 1, wherein when the curve is a Bezier curve, the coordinate information of the subdividing points is acquired by forward differencing.

3. The method for approximating a curve of claim 1, wherein when the curve is an elliptic curve, the coordinate information of the subdividing points is acquired by affine transforming.

4. The method of claim 1, wherein the coefficient of the relationship is based on a type of the curve function.

5. The method of claim 1, wherein calculating the number information of the subdividing points using the subdividing step size corresponding to the set area difference comprises dividing a length on the curve with respect to the X coordinate axis by the subdividing step size.

6. The method of claim 1, wherein calculating the number information of the subdividing points using the subdividing step size corresponding to the set area difference comprises determining a number of subdividing steps of the subdividing step size in the curve with respect to the X coordinate axis.

7. An apparatus for approximating a curve, comprising:
a number acquiring unit configured to acquire number information of subdividing points for subdividing a curve needed to be approximated based on coordinate information of control points of the curve;
a coordinate acquiring unit configured to acquire coordinate information of the subdividing points based on the number information of the subdividing points and the coordinate information of the control points, wherein the subdividing points are points on the curve; and
a curve approximating unit configured to connect the subdividing points with straight lines based on the coordinate information of the subdividing points,
wherein the number acquiring unit comprises:
a curve function acquiring unit configured to acquire a curve function of the curve based on the coordinate information of the control points;
a mutual relationship acquiring unit configured to acquire a relationship between an area difference and a subdividing step size based on the curve function, wherein the area difference is the difference between the area of a curve segment corresponding to the subdividing step size on the curve with respect to an X coordinate axis and the area of a line segment of two points corresponding to the subdividing step size on the curve with respect to the X coordinate axis;
a subdividing step acquiring unit configured to calculate a subdividing step size corresponding to a set area difference based on the relationship between the area difference and the subdividing step size by dividing the set area difference by a coefficient of the relationship between the area difference and the subdividing step; and
a number information acquiring unit configured to calculate the number information of the subdividing points using the subdividing step size corresponding to the set area difference.

8. The apparatus for approximating a curve of claim 7, wherein when the curve is a Bezier curve, the coordinate acquiring unit acquires the coordinate information of the subdividing points by forward differencing.

9. The apparatus for approximating a curve of claim 7, wherein when the curve is an elliptic curve, the coordinate acquiring unit acquires the coordinate information of the subdividing points by affine transforming.

10. An electronic graphic display control method implemented on an apparatus comprising a subdivision module and a coordinate calculation module, the subdivision module and the coordination calculation module including at least one processor, the method comprising:
acquiring, via a subdivision module, number information of subdividing points for subdividing a curve needed to be rendered based on coordinate information of control points of the curve;
acquiring, via a coordinate calculation module, coordinate information of the subdividing points based on the number information of the subdividing points and the coordinate information of the control points, wherein the subdividing points are points on the curve; and
connecting the subdividing points with straight lines based on the coordinate information of the subdividing points and drawing the straight lines connecting the subdividing points according to rendering parameters,
wherein acquiring the number information of the subdividing points comprises:
acquiring a curve function of the curve based on the coordinate information of the control points;
acquiring a relationship between an area difference and a subdividing step size based on the curve function, wherein the area difference is the difference between the area of a curve segment corresponding to the subdividing step on the curve with respect to an X coordinate axis and the area of a line segment of two points corresponding to the subdividing step on the curve with respect to the X coordinate axis;

calculating a subdividing step size corresponding to a set area difference based on the relationship between the area difference and the subdividing step size; and calculating the number information of the subdividing points using the subdividing step size corresponding to the set area difference, wherein calculating a subdividing step size corresponding to a set area difference based on the relationship between the area difference and the subdividing step size comprises dividing the set area difference by a coefficient of the relationship between the area difference and the subdividing step.

11. A graphic display control apparatus comprising:

a number acquiring unit configured to acquire number information of subdividing points for subdividing a curve needed to be rendered based on coordinate information of control points of the curve;

a coordinate acquiring unit configured to acquire coordinate information of the subdividing points based on the number information of the subdividing points and the coordinate information of the control points, wherein the subdividing points are points on the curve; and a curve rendering unit configured to connect the subdividing points with straight lines based on the coordinate information of the subdividing points and draw the straight lines connecting the subdividing points according to rendering parameters, wherein the number acquiring unit comprises:

a curve function acquiring unit configured to acquire a curve function of the curve based on the coordinate information of the control points;

a mutual relationship acquiring unit configured to acquire a relationship between an area difference and a subdividing step size based on the curve function, wherein the area difference is the difference between the area of a curve segment corresponding to the subdividing step size on the curve with respect to an X coordinate axis and the area of a line segment of two points corresponding to the subdividing step on the curve with respect to the X coordinate axis;

a subdividing step acquiring unit configured to calculate a subdividing step size corresponding to a set area difference based on the relationship between the area difference and the subdividing step; and a number information acquiring unit configured to calculate the number information of the subdividing points using the subdividing step size corresponding to the set area difference wherein calculating a subdividing step size corresponding to a set area difference based on the relationship between the area difference and the subdividing step size comprises dividing the set area difference by a coefficient of the relationship between the area difference and the subdividing step.

* * * * *

UNITED STATES PATENT AND TRADEMARK OFFICE
CERTIFICATE OF CORRECTION

PATENT NO. : 8,976,183 B2  
APPLICATION NO. : 12/766531  
DATED : March 10, 2015  
INVENTOR(S) : Yasushi Sugama Page 1 of 1

It is certified that error appears in the above-identified patent and that said Letters Patent is hereby corrected as shown below:

On the Title Page (75) Inventors: Yasushi Sugama, Kawasaki (JP); Zhiming Tan, ~~Shanghia~~ (CN); Xianghui Bai, Shanghai (CN)

Should read:

(75) Inventors: Yasushi Sugama, Kawasaki (JP); Zhiming Tan, <u>Shanghai</u> (CN); Xianghui Bai, Shanghai (CN)

Signed and Sealed this  
Twenty-first Day of July, 2015

Michelle K. Lee  
*Director of the United States Patent and Trademark Office*